United States Patent Office.

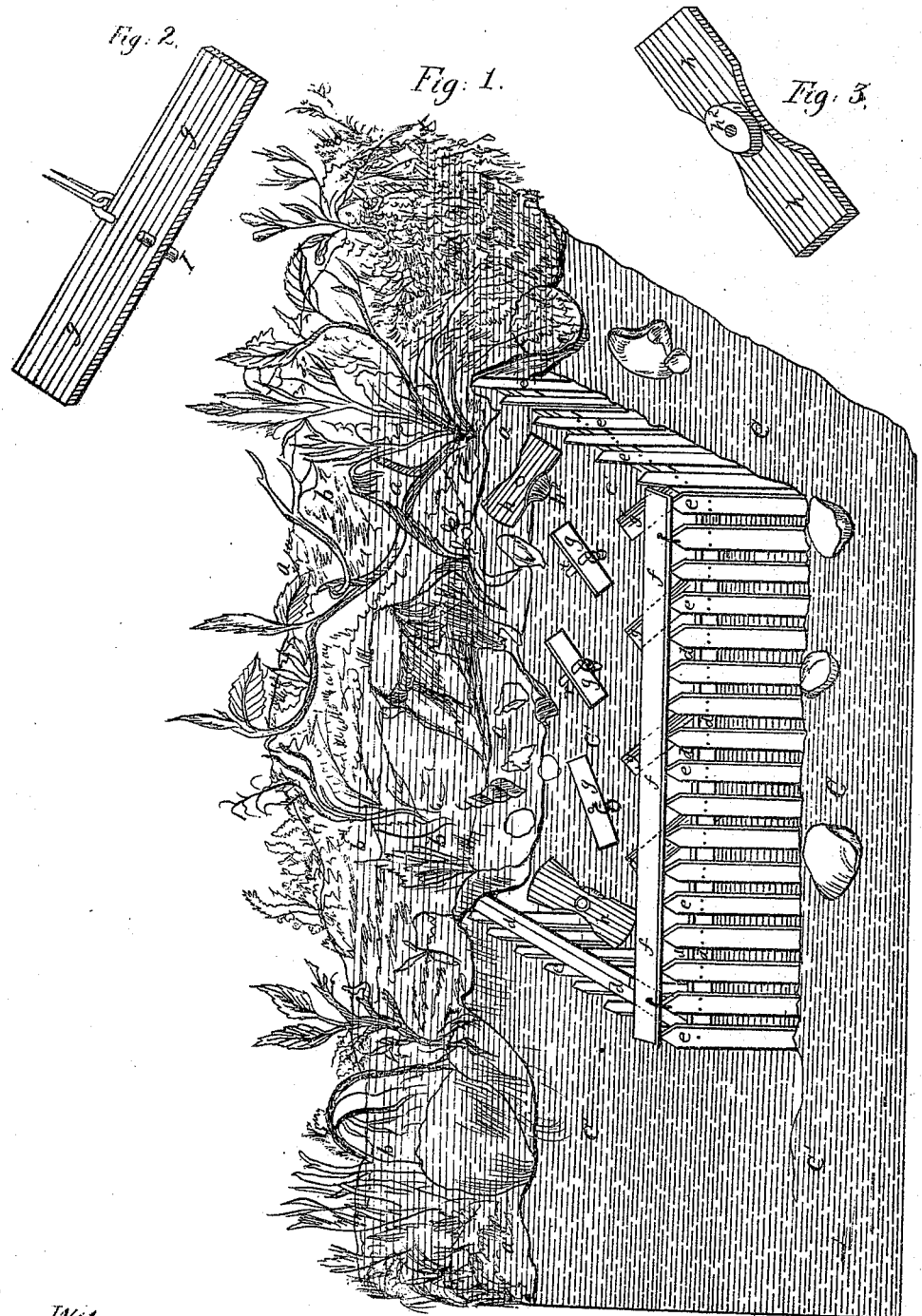

CONSTANTIN DREXLER, OF WASHINGTON, DISTRICT OF COLUMBIA.

Letters Patent No. 72,177, dated December 17, 1867.

DEVICE FOR SECURING AND FEEDING SOFT CRABS.

*The Schedule referred to in these Letters Patent and making part of the same.*

TO ALL WHOM IT MAY CONCERN:

Be it known that I, CONSTANTIN DREXLER, of the city of Washington, in the county of Washington, and District of Columbia, have invented and made a new and useful method of obtaining, securing, feeding, and supplying, alive, in unusual numbers, soft crabs and other crustacea, as well as securing, feeding, and supplying, in large numbers, in and out of regular season, migratory and other fish; and I do hereby declare that the following is a full, clear, and exact description of the same, reference being had to the accompanying drawing, and to the letters of reference marked thereon, making a part of this specification.

Figure 1 represents, in perspective, the apparatus or contrivance employed for the purpose.

Figure 2 represents the adjustable float with ring and staple attached.

Figure 3, inverted view of the form of float with block attached.

The nature of my invention consists in the manner or mode of obtaining, securing, and feeding crabs, lobsters, turtles, migratory and other fish, in unusual numbers, in fresh, live, and healthy condition; affording a ready supply, at moderate rates of price, in and out of regular season, by means of a very simple, cheap, and convenient apparatus, which I designate as the crustaceorium and piscatorium, which will be more fully described and explained in such manner as to enable others to become skilled in the construction, operation, uses, and advantages thereof.

It has long been a desideratum with many persons to be enabled to supply, in proper numbers to meet a growing demand, the crabs, lobsters, turtles, and fish, which are known to be periodical in their habits, and which, moreover, are not found in some locations at all, north or south of certain latitudes.

In some portions of the world, more especially in Germany, fresh-water fish (and to a limited extent some kinds of salt-water fish) are caught in limited numbers, placed in small ponds or fish-pens, and supplied to the consumer. My method of supply, however, presents some difference in relation to crabs, lobsters, and turtles, as also migratory fish, especially shad, all of which being considered as great delicacies for food, and continue but for a brief season, are consequently sought after with eagerness for edible purposes, and, being at times very scarce, command high prices, as well as not being available in many sections of country. To overcome many difficulties heretofore presented, and to meet a rapidly-increasing demand, I have been led to believe (through observation, and somewhat of a familiarity with several branches of natural science) that a method or plan could be originated and practically put in operation for the purpose.

Scientific naturalists are familiar, more or less, with the fact that all species of crustacea shed or cast their shells at least once annually, from year to year, at periods varying more or less, early or late, according to climate and species. With regard, however, to the time when the casting of the shell ceases, learned naturalists differ in opinion.

The sea-tortoise, or, as it is commonly called, the green turtle, also being deemed a great delicacy as an edible marine animal, is also sought after, but the supply is never adequate to the demand, nor is the market or source of supply at all times convenient.

To make my method most available, useful, and profitable, the apparatus used must be located in or near the vicinity of an ample supply of pure moving salt water, and as convenient as circumstances will admit to sea, bay, or river, where the crab, lobster, turtle, and shad are in the habit of frequenting for feeding. The location for the apparatus must be where there is a gradually-sloping shore or beach, and where the water rests on a hard bottom, as free as possible of obstructions, and where at ebb tide there is not less than two feet of depth of water (the tidal flow, however, varying the depth more or less) at the shallowest part, and not less than six feet of the greatest depth required, so as to afford a sufficient volume of moving salt water, and to guard against extreme cold or excessive thickness of ice during mid-winter, and to supply as much of the natural element as occasion and circumstances will suggest.

*Description of my Crustaceorium and Piscatorium.*

The letters of reference $a\ a\ b\ b$, fig. 1, mark a representation of a river-shore or margin, having a gradual-sloping hard bottom, $c'\ c'\ c'\ c'$. Letters $d\ d\ d\ d$ mark suitable substantial rails, forming a framing of two ends and one front, having affixed thereto, at intervals of about one inch, upright boards, palings, or stakes $e\ e\ e\ e$, extending down the full depth of water, close to or driven into the bottom thereof; the upper ends being pointed, if desired, and rising out of and above the surface of the water not less than two feet clear of high tide. These palings or narrow boards must be securely nailed to the framing; the whole forming an enclosure two hundred feet long by one hundred wide, varying, however, in length and width, with more or less area, as convenience, location, and circumstances may suit—an enclosure four hundred feet long by two hundred feet wide, affording eighty thousand square feet in area, with sufficient volume of water to accommodate conveniently forty thousand living crabs without crowding. Letters $ffff$ mark the representation of a fender or hinged guard, formed of suitable boards, in width from twelve to fourteen inches wide. This fender or guard must be attached with suitable hinges, or in any other manner, so that it will rest or be on an incline in position, as shown in fig. 1. This fender must be arranged all the way around the front and ends of the enclosure, and is designed to prevent the crabs from climbing or floating over the top of the enclosure in the event of excessive high flow of water. The drawing only shows the fender attached to the front of the enclosure. Letters $g\,g\,g\,g\,h\,h$ mark representations of lengths of boards from six to eight feet long, and twelve to fourteen inches wide, more or less, and may be of one or both of the shapes shown, and are attached to the bottom of the enclosure either by ring, hooks, and staples, so that the longer ones may turn over by their edges from one side to the other. The ones marked $h\,h$, being of a different shape, must have a block of wood, $h^2$, from four to six inches thick, nailed to their centres, and a suitable-sized auger-hole made through the centre of the board, which is to be connected in a secure manner to the bottom of the enclosure by means of a headed bolt of metal or hard wood, driven sufficiently deep, and also so that the devices shown may move or rotate around the headed bolt. Letters $i\,i$ mark plugs or bolts of metal, not less than twelve inches long, which are inserted near the upper edge, in the manner shown, so that the plug may project equally in length from both sides of the boards, and not only serve as weights or sinkers to keep the boards from being turned over by the agitation of the water, but also serve as legs or rests, allowing spaces between the board and bottom of the enclosure. These devices or boards are arranged at intervals of two to three feet apart, and in opposite oblique directions relative to each other, and situated in the shallowest part of the enclosure, so as to be accessible. Said devices I term movable or adjustable floats, serving as artificial hiding-places, the purpose of which will be hereinafter made known. This marine enclosure, as shown in fig. 1, may be made portable in sections, and removed, when desired, from one locality to another, or made permanent, in suitable depths of water, as circumstances will admit. If portable, the whole structure will have to be anchored or securely confined in position, in the bed of rivers, bays, or sea, contiguous to the shore or beach thereof.

It is well known to fishermen that soft crabs are never, or rarely, taken by bait, and are not found floating or moving in the water, as they cannot seek food whilst soft; consequently they have to be hunted after in retired places, and among the tufts of marine weeds or grass; consequently this accounts for so few soft crabs being found in comparison to the number of hard or matured crabs, the proportion often being but one or two soft to fifty or more hard ones. As the soft crab is deemed so great a delicacy, all lovers of it seek it with avidity in the brief season it is procurable, and, as there is little or no waste as food, compared with it if in the hard condition, it is a great object and desire to have them in greater numbers.

As the crab, when shedding or casting its shell, becomes perfectly inert and helpless, in order to be secure from danger and injury its instinct induces it to seek some retired hiding-place, where the laws of nature may be fulfilled; consequently the hard and growing crab secretes itself within clefts or holes of submerged rocks, or frequents tufts of grass or beds of marine moss beneath water, where, in the course of a few hours' time, the process of casting the shell is accomplished, and, within the period of forty-eight hours, the jelly-like, soft, and helpless animal gradually increases in size, and assumes again a hard shell, and an active, vigorous condition.

At some seasons the crab becomes very scarce, the cause of which cannot be accounted for, and, owing to its natural shyness, it avoids danger as much as possible, and suddenly disappears beneath the water; consequently catching by the slow process of baiting is attended with much trouble and vexation. And, again, as the crab burrows in the muddy deposit of the water, and is also known to bore or penetrate into the sides or banks of the river, bay, or sea to several feet depth, it not unfrequently occurs that miles in extent of water may be hunted over without seeing or securing a single crab, although the localities are known at other times to abound with them. Therefore it is designed, with the aid and use of my invention, to entirely overcome these peculiarities and difficulties, and to afford entire success in the taking of the crab, both in its hard and soft state, and thus supplying it in increased numbers, and affording it longer in season.

By the method I have herein shown and explained, the lobster, the green turtle, and also the shad, may be secured, fed, and supplied in unusual numbers, even in mid-winter, at much less trouble, labor, and expense than by the ordinary slow, uncertain, tedious, and irregular mode usually resorted to. Each species of the animals above referred to should, however, be kept in separate enclosures by themselves, though adjacent or contiguous, for convenience to the procurer and dealer.

In using the enclosure for supplying turtles and kindred animals, it may be more desirable to locate it where they are usually found, or where they frequent to deposit their eggs, in the sands of the sea-beach, in which case, after securing the animals in the well-known way of turning them on their backs, they can be driven within the enclosure, and there secured alive and fresh, in large numbers, and where the young and newly-hatched turtles may be retained and fed; the devices termed adjustable floats within the enclosure serving for hiding-places for them.

In using the enclosure for shad or other migratory fish, it should be located so as to have the benefit of an inlet to a supply of fresh water, or where the change from saline to fresh or nearly so is gradual, the more to insure the existence of the fish, for, as the shad especially seeks fresh water to spawn, too sudden a transition from one kind of water to another might materially interfere, and possibly prove fatal.

The object of my invention is not to propagate the several species referred to, from their eggs or spawn, but to procure them thereafter in the young condition, at intervals out of season, and when they can be bought at very low rates, and supplied in very large numbers.

The operation or employment of my method is as follows, viz: When the crab is first in season, which is about the first part of the month of May, the enclosure being provided, as many hard crabs as can be procured are placed within the enclosure. As the period of time approaches for shedding or casting their shells, the hard crab seeks out a hiding or very retired place, and, in order to accommodate the crabs, the floats $g\ g\ h\ h$, fig. 1, are employed, beneath which the crab secretes itself and reposes, being obscured from observation and molestation. The process of casting or leaving their shell will be accomplished in due time, and for several hours thereafter the crab is quite inert and perfectly helpless, presenting a soft and almost jelly-like condition. During this state the helpless animal can be readily taken by hand, or in any other convenient manner, and with the least possible trouble; and in the use of the floats or artificial hiding-places, it is merely necessary to gently turn over the floats $g\ g$, or rotate the floats $h\ h$, when the soft crab will be found in numbers and in good condition. As hereinbefore stated, the floats or artificial hiding-places are submerged, and situated in the most shallow depth, near to the shore-side, for more convenience. In course of time the surface of the floats becomes coated over with moss and sea-grass, which will the more approach the natural state, and better suit the animal in its habits.

The object of arranging the floats $g\ g\ h\ h$ at intervals in oblique position relative to each other is to enable the crab to change or shift its position as its instinct may induce, and also so that the crabs may interfere with each other, in the hard and soft condition, as little as possible, and furthermore, to prevent the soft crab from being disturbed in case of the water being agitated to any very great degree, by the action of storms, or from any other cause, such as the disturbance produced by the swells from passing vessels, in all of which cases the floats act as shields or protectors from disturbance of the water. The floats also protect from injury of any kind in searches after the crab, as, for instance, in wading in the water to collect them, as they cannot be mashed or tread on.

Having explained the nature and advantages of my invention, and shown and described the same for the several purposes specified,

What I claim as new and useful, and desire to have secured by Letters Patent of the United States, is as follows, viz:

I claim a marine enclosure, constructed and arranged as shown, and provided with the guards or fenders $f$ and the movable floats $g\ g\ h\ h$, or their equivalents, forming artificial hiding-places, arranged as shown and for the purposes substantially as described.

CONSTANTIN DREXLER.

Witnesses:
   CHARLES WALTER,
   I. F. PARKER.